UNITED STATES PATENT OFFICE.

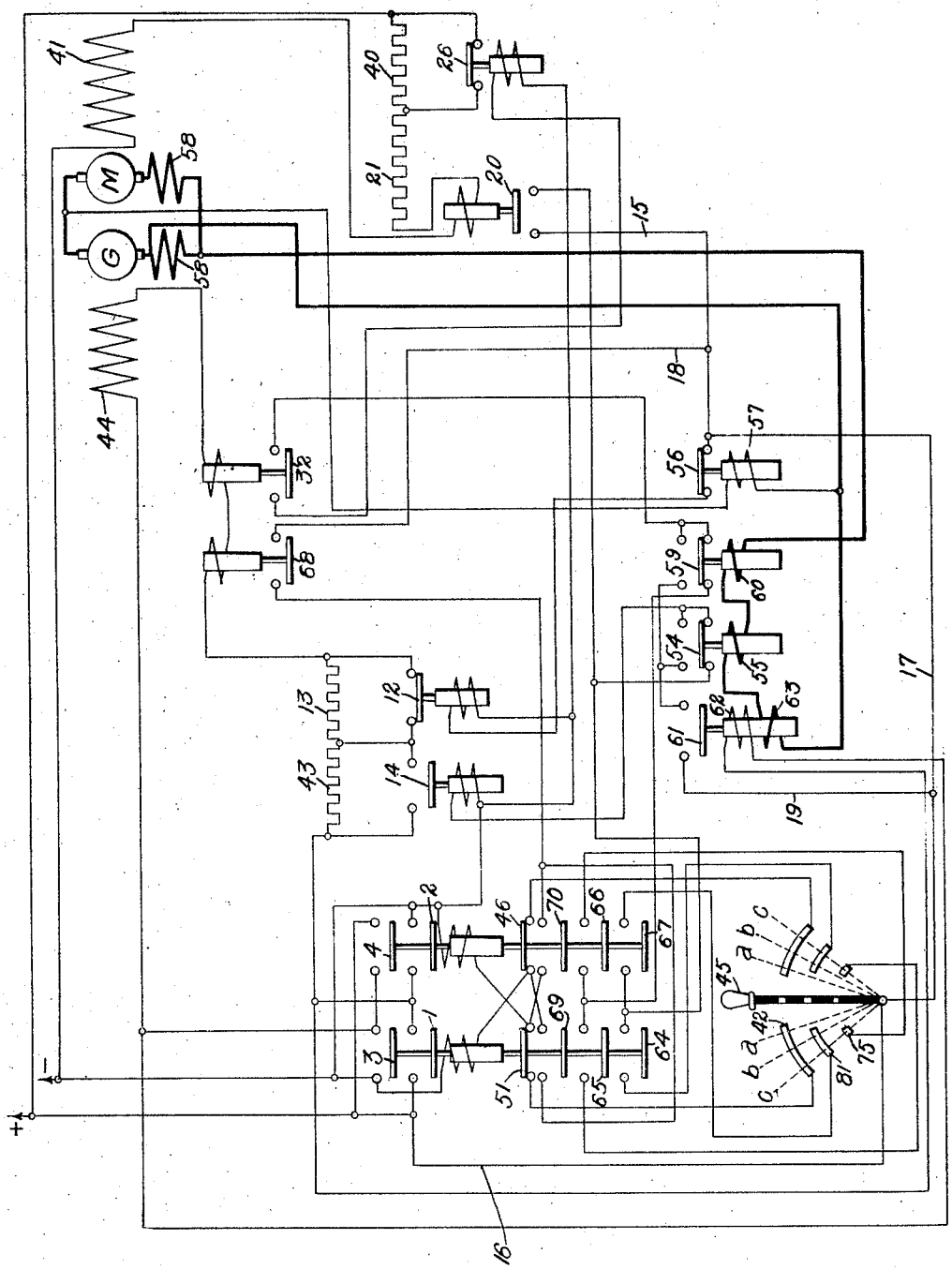

EDWIN S. LAMMERS, JR., OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,411,042.

Specification of Letters Patent. Patented Mar. 28, 1922.

Application filed March 8, 1919. Serial No. 281,527.

*To all whom it may concern:*

Be it known that I, EDWIN S. LAMMERS, Jr., a citizen of the United States, and a resident of Wilkinsburg, in the county of Allegheny and State of Pennsylvania, have invented a new and useful Improvement in Control Systems, of which the following is a specification.

My invention relates to electrical systems and particularly to such systems as are employed for the control of dynamo-electric machines.

Though my invention is of general application, it is of particular value in connection with systems embodying motors and generators which are connected in circuit and is an improvement upon a system forming the subject-matter of my co-pending application, Serial No. 281,525, filed March 8, 1919.

One object of my invention is to provide a control system for a motor and a generator connected in a closed circuit in which the same resistors may be employed for accelerating and decelerating purposes and for automatic control in accordance with circuit conditions.

A second object of my invention is to provide a system of the above-described character which shall employ a minimum number of switches.

A further object of my invention is to provide such a control system which shall be adapted for control by a three-point controller.

Another object of my invention is to arrange the circuits in novel fashion so as to prevent reversal of the machines until circuit conditions make such change desirable.

Still another object of my invention is to provide such a system in which the generator-field strength may be controlled by a resistor which is normally short-circuited to decrease the time element required for acceleration purposes and which may be inserted into circuit to weaken the field strength and to regulate the generator upon the generator voltage reaching a predetermined value.

According to the present invention, the armatures of the generators and the motors are connected in a closed circuit, the field-magnet windings of the several machines being separably connected to a source of energy, each in series with a resistor. The motor-field-magnet windings are permanently connected to a source of constant voltage, and the generator-field-magnet windings may be connected to that source by reversing switches when the master controller occupies the first of three operative positions. The generator-field resistor is composed of two portions, one of which, a so-called "permanent" resistor, is normally short-circuited in order to decrease the time lag required for accelerating the generator, the short-circuit being adapted to be removed upon the voltage of the generator exceeding a predetermined value, or under other desirable predetermined conditions. The other section of the resistor may be short-circuited for acceleration purposes upon the controller handle occupying its second position. This other section may be automatically inserted into, and excluded from, the circuit of the field-magnet winding in accordance with the value of the current traversing the circuit of the armatures for regulating purposes. In its third position, the master controller is adapted to open a short-circuit for the motor-field resistor in order further to accelerate the motor.

In the circuit of the generator field-magnet winding are a pair of actuating coils for switches one of which is adapted to maintain energized the circuit of the actuating coil of each of the reversing switches in order to prevent the premature opening of these reversing switches, and thereby to prevent reversal, until the generator field strength falls to a predetermined value and the other of which pair of switches is adapted to control the motor-field-resistor switch. In the circuit of the motor field-magnet winding is inserted an actuating coil for a switch which is adapted to control the generator resistor switch. A plurality of switches having actuating coils controlled in accordance with the current conditions of the main circuit are provided for controlling the resistor switches, one of the plurality of switches being provided also with a shunt coil, whereby it is prevented from operating except during deceleration.

The single figure of the accompanying drawing is a diagrammatic representation of circuits and apparatus illustrating my invention.

A generator G and a motor M have armatures connected in series. In practice, a plurality of generators and a plurality of motors are provided, as in the case of my above-mentioned application, the armatures of the generators and the motors being disposed alternately in the circuit. In order the more clearly to illustrate my invention, I have simplified the drawing by eliminating several of the machines.

The motor M is provided with a separately excited field-magnet winding 41 and the generator G with a separately excited field-magnet winding 44. In practice, the motor M will be provided also with variable potential field-magnet windings energized by an exciter, as is illustrated in my above-mentioned application.

A resistor, sections of which are designated 21 and 40, is in series with the motor field-magnet winding 41, the resistor portion 40 being controlled by an electromagnetic switch 26, which is normally closed by gravity, though it may be designed so as to be closed electromagnetically. A resistor, composed of two sections 13 and 43, is connected in series with the generator field-magnet winding 44, the section 13 being controlled by an electromagnetic switch 12, which is normally closed, and the portion 40 being controlled by an electromagnetic switch 14. Additional resistors may, of course, be included in the circuits both of the motor field-magnet winding 41 and the generator field-magnet winding 44, which resistors may be controlled in any desired way. One of the main objects of my invention, however, is to effect the acceleration of the motor by means of resistors 40 and 43 only, each controlled by a single switch, 26 and 14, respectively.

The direction of the current traversing the generator field-magnet winding 44 is controlled by electromagnetic switches 1, 2, 3 and 4. I have illustrated the switches 1 and 3, as also the switches 2 and 4, as mechanically connected together and controlled by a single actuating coil. In practice, as in my above-mentioned application, the switches 1, 2, 3 and 4 are separate.

A master controller 45 is provided, having three direct and three reverse operative positions, a, b and c, in the first of which it controls the circuit of the actuating coil of the reversing switches 1 and 3 or 2 and 4, in the second of which it controls the switch 14, and in the third of which it controls the switch 26. In the first position, therefore, the circuit of the field-magnet winding 44 is closed; in the second, the resistor 43 is short-circuited to increase the excitation of the generator field-magnet winding 44, and in the third, the resistor 40 is inserted into circuit with the field-magnet winding 41 in order further to accelerate the motor.

Switches 51, 69, 65 and 64 are mechanically connected to the reversing switches 1 and 3. Switches 46, 70, 66 and 67 are mechanically connected to the reversing switches 2 and 4. The switches 51 and 46 respectively control the actuating coils of the reversing switches 2 and 4, and 1 and 3. The switches 69 and 70 establish holding circuits for the actuating coils of the reversing switches 1 and 3, and 2 and 4, respectively, when the relay 68, which has an actuating coil in circuit with the field-magnet winding 44, is closed. The relay 68 should be designed so as to be closed at a very small current value. The actuating coil of the relay 68 may, if desired, be connected across the terminals of the generator armature, or in any other equivalent way, so as to insure that, after the reversing switches have been closed, they will be maintained closed until the motor speed falls to a very low value.

The switches 64 and 67 control the circuit of the actuating coil of the switch 14 and the switches 65 and 66 that of the actuating coil of the switch 26, so that not until the reversing switches have been closed can the actuating coils of the switches 14 and 26 be energized. The actuating coil of the switch 14 is controlled by a relay 54 and by a relay 20, the latter of which is provided with an actuating coil in circuit with the field-magnet winding 41. The actuating coil of the switch 26 is controlled by a relay 59 and a relay 32, the latter of which is provided with an actuating coil in circuit with the field-magnet winding 44. The relays 20 and 32 are, what I have termed in my above-mentioned application, "field-interlocking" relays and should preferably be connected, as in the said application, in parallel to the field-discharge resistors (not illustrated). The relays 54 and 59, as also a relay 61, are provided with coils 55, 60 and 63, respectively, which are connected across the terminals of one of the generator or motor-compensating windings 58. The relay 61 is provided also with a shunt coil 62, which is so wound as normally to oppose the coil 63, but which will aid the coil 63 during deceleration. During acceleration, therefore, the relay 61 will remain in its open position; during deceleration, it will be closed. The relays 54 and 59 are connected to the positive line conductor through the switch 64 or the switch 67 and the switch 65 or the switch 66, respectively, during acceleration. During deceleration, the said relays are connected to the positive line conductor by the relay 61.

The switch 12 is normally closed by an actuating coil, the circuit of which is connected to the positive and negative conductors through a relay 56 having an actuating coil 57, which is connected across the terminals of the generator armature. When the voltage of the generator builds up to a predetermined value, this circuit will become opened to cause the insertion, into the circuit of the field-magnet windings 44, of the resistor portion 13. This resistor portion 13, therefore, serves a double purpose, namely, to initially "force" the field of the generator and to regulate the generator-field excitation in accordance with the value of the voltage of the generator.

In operation, the controller 45 is actuated, let us say, to the left to the position $a$. The controller arm will thereupon make contact with a contact member 42, whereupon a circuit will be established from the positive line conductor by way of a conductor 16, through the controller arm 45, the contact member 42, the switch 51 and the actuating coil of the switches 2 and 4 to the negative line conductor. The reversing switches 2 and 4 will thereupon be closed to establish the circuit of the field-magnet windings 44 for operation of the generator with a certain polarity. The circuit of the shunt coil 62 will also be energized by the closing of the reversing switches. The circuit of the field-magnet winding 44 will comprise the resistor 43 but the resistor 13 will be short-circuited because the actuating coil of the switch 12 is maintained energized by a circuit which extends from the positive line conductor, by way of conductors 16 and 17, through the relay 56 and the actuating coil of the switch 12, to the negative line conductor.

The generator will thereupon operate to drive the motor in one direction. When the current traversing the circuit of the field-magnet winding 44 rises to a predetermined, small value, the actuating coil of the relay 68 will close the relay, thereby establishing a holding circuit for the actuating coil of the reversing switches 2 and 4, this circuit extending from the positive line conductor, by way of conductors 16, 17 and 18, through the relay 68, the switch 70 and the actuating coil of the reversing switches 2 and 4, to the negative line conductor. The reversing switches 2 and 4 will now be maintained closed, irrespective of the position of the controller 45, until the current traversing the field-magnet winding 44 falls to a value sufficiently low to permit of the opening of the relay 68.

The relay 68 must be so designed as not to operate when the master switch 45 is first actuated to the position $a$. If the relay were to operate at a time when the resistor 43 is in circuit with the winding 44, it could never open so long as the winding remained energized, because the lowest current value would obtain at such time. This, of course would prevent reversal. The relay 68 should operate at a low current value, but only after the resistor 43 has become short-circuited.

The controller 45 may now be actuated to the position $b$, so as to engage the contact member 81, whereupon a circuit will be established from the positive line conductor, by way of the conductor 16, through the controller arm 45, the contact member 81, the switch 67, the relay 54 and the actuating coil of the switch 14, to the negative line conductor. The switch 14 will thereupon operate to short-circuit the resistor section 43 and thus increase the field-excitation of the generator. The short-circuiting of the resistor section 43 causes the voltage of the generator G to assume a corresponding value, and the motor M will be accelerated to a corresponding degree. If the current traversing the main circuit, comprising the motor M and the generator G, exceeds a predetermined value, the coil 55 will be energized sufficiently to cause the opening of the relay 54 and the consequent opening of the circuit of the actuating coil of the switch 14, whereupon the resistor section 43 will be reinserted into the circuit to decrease the excitation of the generator field-magnet winding 44. The relay 54 will flutter to cause the alternate closing and opening of the switch 14 until the voltage of the generator G builds up to normal value. The same resistor 43, therefore, serves the double purpose of accelerating the generator and regulating its speed in accordance with the current traversing its circuit.

When the controller 45 is actuated to its third position $c$, to engage a contact member 75, a circuit will be established from the positive line conductor, by way of the conductor 16, through the controller arm 45, the contact member 75, the switch 66, the relays 59 and 32 and the actuating coil of the switch 26, to the negative line conductor. The switch 26 will thereupon be opened to insert the resistor section 40 into circuit with the field-magnet winding 41, thereby to cause further acceleration of the motor M. As the circuit of the actuating coil of the switch 26 is controlled by the field interlocking relay 32, the switch 26 cannot be opened until the current traversing the generator field-magnet winding 44 reaches a value high enough to cause the closing of the relay 32, so that in case the controller arm 45 is actuated, not step-by-step, as above described, but to the position $c$, in one step, there will be no danger of the switch 26 opening prematurely before the field-magnet winding 44 has been excited to normal value. In practice, the controller arm 45 will be actuated by a rapid movement to its final position $c$.

If the current traversing the circuit of the armatures of the motor M and the generator G exceeds a predetermined value, during the further acceleration of the motor, the relay 59 will be actuated by its coil 60 to break the circuit of the actuating coil of the switch 26, permitting the switch 26 to be reclosed by gravity and the resistor section 40 to be again short-circuited. The relay 59 will flutter to cause the opening and the closing of the switch 26 in accordance with the value of the current traversing the circuit of the motor and the generator armatures, so that the single switch 26 will serve not only for the purpose of accelerating the motor M, but also to regulate its speed in accordance with the current traversing the circuit of the motor and generator armatures.

The motor M will now operate at its normal operating speed, with the generator voltage at a normal value and the motor field weakened to a normal degree. If, at any time during normal operation, the current traversing the main circuit exceeds a predetermined value, the relays 54 and 59 will operate, in the manner described, in connection with the description of the process of acceleration, to control the resistor sections 43 and 40 and thus to maintain the current traversing the main circuit within predetermined limits.

The generator G is usually driven from a fly-wheel set. When the load upon the motor M is heavy, the fly-wheel is made to release its energy through a slip regulator which is connected in the secondary circuit of a main induction motor, which drives the generator G. If the load is sustained for any appreciable length of time, the speed of the fly-wheel set is considerably reduced as the fly-wheel releases its energy, and the generator voltage is thereby accordingly reduced, which not only affects the speed of the motor M but also the power that can be supplied to it. The generator voltage, furthermore, has a tendency to become reduced under heavy loads, due to the inherent voltage characteristic of the generator. I provide for this difficulty by insuring the insertion of the additional resistor section 13 into circuit with the field-magnet winding 44, upon the generator voltage exceeding a predetermined limit, through the opening of the switch 12, by the breaking of the circuit of its actuating coil by the relay 56, the actuating coil 57 of which is responsive to the voltage of the generator. When the voltage of the generator becomes decreased from any causes, as those above referred to, the coil 57 will not be able to maintain the relay 56 in its open position, whereupon the relay 56 will be closed by gravity to cause again the energization of the actuating coil of the switch 12, the consequent closing of this switch 12 and the resulting short-circuiting of the resistor portion 13, in order to increase the excitation of the field-magnet winding 44. The switch 12, like the switches 14 and 26, may thus flutter in accordance with the electrical conditions of the machine, the switches 14 and 26 being responsive to current conditions and the switch 12 to voltage conditions.

The resistor section 13 thus plays a double function, namely, as it is normally short-circuited, it serves initially to allow the overexcitation of the generator field-magnet winding 44, so as to reduce the time interval necessary to bring the excitation of this winding to normal value and, secondly, it serves to regulate the excitation of the winding in accordance with the value of the voltage of the generator.

When it is desired to stop the motor, the controller arm 45 is actuated toward its "off" position. The motor M then operates as a generator when the electromotive force generated by it exceeds the voltage of the generator G. The current now traverses the circuit of the armatures in the reverse direction so that the coil 63 will aid the coil 62. The relay 61 will accordingly be actuated to its upper position, to establish a circuit from the positive line conductor, by way of conductors 16 and 19, to the relay 61 and from there to each of the relays 54 and 59. The relays 54 and 59 will now respectively control the switches 14 and 26 when they occupy their upper, instead of their lower, positions, the switch 14 temporarily short-circuiting the resistor portion 43, to increase the field excitation of the generator G, and the switch 26 being temporarily actuated to insert the resistor section 40, to decrease the excitation of the motor field-magnet winding 41, in accordance with the value of the current traversing the circuit of the armatures, so as correspondingly to decrease the current traversing this circuit. The relays 54 and 59 will, of course, operate as fluttering relays, in the same manner as during acceleration. The resistor sections 43 and 40, therefore, serve not only for accelerating the motor, but also for decelerating purposes and for regulating the speed of the motor both during acceleration and deceleration.

When it is desired to operate the motors in the opposite direction, the controller 45 may be actuated to the right. This actuation may be effected step-by-step or by one rapid movement from the extreme position $c$, corresponding to operation in one direction, to the extreme position $c$ corresponding to operation in the reverse direction. The circuits of the actuating coils of the switches 14 and 26 are immediately opened at the contact members 81 and 75, but the control of the switches is transferred, as just described in connection with the description of the operation of bringing the motor to rest, to the relay 61. Not until the speed of the motor falls to a sufficiently low value and the excitation of the generator field-magnet winding 44 becomes sufficiently reduced to cause the opening of the relay 68, however, can the reversing switches 2 and 4 be opened. The reversing switches 1 and 3 cannot be closed until the switch 46 assumes its normal position following the opening of the switches 2 and 4. Not until the reversing switches 1 and 3 are closed can the actuating coils of the switches 14 and 26 be controlled by the controller 45, since the circuits of these coils are open at the switches 64 and 65. Meantime, the relays 54 and 59 will flutter so as to bring the motor gradually to low speed or to rest.

It will be noted, further, that, just as the relay 32 controls the switch 26 during acceleration, the relay 20 controls the switch 14 during deceleration. The control circuit may be traced from the positive line conductor, by way of conductors 16, 17 and 15 through the relays 20 and 54 and the actuating coil of the switch 14, to the negative line conductor. The permanent reopening of the switch 14 to cause the reinsertion, into the circuit of the field-magnet winding 44, of the resistor 43 is thus prevented until the switch 26 has become permanently closed by gravity to increase the excitation of the field-magnet winding 41 to a degree sufficient to cause the permanent closing of the relay 20.

When the generator voltage has become reduced to a sufficiently low value, the relay 68 will be opened, the reversing switches 2 and 4 will thereupon be opened, the reversing switches 1 and 3 will become closed, and the acceleration of the motor in the reverse direction will take place in a manner substantially the same as that described above.

I wish it to be understood that the disclosed embodiment of my invention is illustrative purely. Many details necessary for the practical operation of the system have been omitted, in order to simplify the drawings, I desire that my invention be construed as broadly as indicated in the annexed claims.

I claim as my invention:

1. The combination with a dynamo-electric machine and a switch for controlling said machine, of a pair of switches for respectively controlling the operation of said controlling switch during the acceleration and the deceleration of said machine.

2. The combination with a pair of dynamo-electric machines having a pair of resistors respectively associated therewith, a normally open single switch for short-circuiting one of said resistors, and a normally closed single switch for short-circuiting said other resistor, of means for closing said normally open switch to accelerate one of said machines, means for opening said normally closed switch when the current traversing said one machine exceeds a predetermined value and means for alternately opening and closing both of said switches under predetermined conditions.

3. The combination with a motor and a generator having armatures connected in series and field-magnet windings each having a resistor in circuit therewith, of a switch for controlling each of said resistors and a pair of switches having actuating coils in circuit with said armatures for respectively controlling said controlling switches.

4. The combination with a motor and a generator having armatures connected in series and field-magnet windings each having a resistor in circuit therewith, of a switch for controlling each of said resistors and a pair of switches having actuating coils in circuit with said armatures for respectively controlling said controlling switches.

5. The combination with a motor and a generator having armatures connected in series and field-magnet windings each having a resistor in circuit therewith, of a switch for controlling each of said resistors, each having an actuating coil, a pair of switches having actuating coils in circuit with said armatures for respectively controlling the circuits of said first-named coils, a pair of switches for reversing the direction of current flow in said generator winding, a pair of switches mechanically connected to each of said reversing switches for respectively controlling each of said first-named coils during acceleration and a switch for controlling both of said first-named coils during deceleration.

6. The combination with a motor and a generator having field-magnet windings and resistors in circuit therewith, of a three-point controller and means for closing the circuit of said generator field-magnet winding when said controller occupies one of its positions, for controlling one of said resistors when said controller occupies a second position and for controlling said other resistor when said controller occupies a third position.

7. The combination with a dynamo-electric machine and a switch for closing the field circuit of said machine, of means responsive to the electrical conditions of said machine for maintaining said switch closed.

8. The combination with a dynamo-electric machine and a switch for closing the field circuit of said machine having an actuating coil, of a second switch for controlling the energization of said coil, said second switch having an actuating coil in the circuit of said machine.

9. The combination with a pair of dynamo-electric machines, of means responsive to the field strength of one of said machines for controlling the field strength of said other machine, and means responsive to the current traversing the armature of one of said machines for rendering said controlling means ineffective.

10. The combination with an electric generator having a resistor associated therewith and an electric motor in series relation with said generator, of means for controlling said resistor to over-excite the field of said generator and thereby expedite the acceleration of said motor, said means being responsive to the voltage of said generator, and current-responsive means for regulating the voltage of said generator during the normal operation of said motor.

11. The combination with a dynamo-electric machine having a resistor in two sections associated therewith and a single switch for shunting one of said sections, of means for alternately closing and opening said switch according as the value of the current traversing said machine falls below or exceeds a predetermined value, a switch for normally shunting said other section, and means for controlling said last-named switch in accordance with the value of the voltage of said machine.

12. The combination with a dynamo-electric machine having a resistor associated therewith, of means for inserting a portion of said resistor into circuit when the current traversing said machine exceeds a predetermined value, and means for short-circuiting a portion of said resistor when the voltage of said machine falls below a predetermined value.

In testimony whereof, I have hereunto subscribed my name this 26 day of Feb. 1919.

EDWIN S. LAMMERS, Jr.